United States Patent [19]

Petrosov et al.

[11] Patent Number: 5,845,880
[45] Date of Patent: Dec. 8, 1998

[54] HALL EFFECT PLASMA THRUSTER

[75] Inventors: V. A. Petrosov; Y. M. Yashnov; A. S. Koroteev; A. I. Vasin; V. I. Baranov, all of Moscow, Russian Federation; J. F. Poussin, Ramonville; J. M. Stephan, Auzeville, both of France; P. A. Balaam, Boulogne-Billancourt, France; J. K. Koester, Palo Alto; E. J. Britt, Cupertino, both of Calif.

[73] Assignee: Space Power, Inc., San Jose, Calif.

[21] Appl. No.: 763,692

[22] Filed: Dec. 9, 1996

[30] Foreign Application Priority Data

Dec. 9, 1995 [RU] Russian Federation ............. 95120367
Apr. 1, 1996 [RU] Russian Federation ............. 96105557

[51] Int. Cl.$^6$ ..................................................... B64G 1/26
[52] U.S. Cl. ................................ 244/169; 60/202; 60/230
[58] Field of Search ................................ 244/169, 204, 244/205; 60/202, 230

[56] References Cited

U.S. PATENT DOCUMENTS

| | | | |
|---|---|---|---|
| 3,106,058 | 10/1963 | Rice | 60/35.5 |
| 3,225,236 | 12/1965 | Meyer | 313/63 |
| 3,735,591 | 5/1973 | Burkhart | 60/202 |
| 4,277,939 | 7/1981 | Hyman, Jr. | 60/202 |
| 4,862,032 | 8/1989 | Kaufman et al. | 313/359.1 |
| 5,475,354 | 12/1995 | Valentian et al. | 335/296 |

OTHER PUBLICATIONS

PCT International Search Report dated 13 Aug. 1997, 5 pages.

*Primary Examiner*—Robert J. Oberleitner
*Assistant Examiner*—Tien Dinh
*Attorney, Agent, or Firm*—Fliesler, Dubb, Meyer & Lovejoy LLP

[57] ABSTRACT

In a Hall effect thruster, especially for use in maneuvering satellites, a stream or plume of ions, used to produce the thrust is deflected, by appropriate adjustment of a magnetic field, so as to steer the satellite or other vehicle. The channel, along which the ions are accelerated, is preferably flared outwardly at its open end so as to avoid erosion which would otherwise be caused by the deflection. The adjustment of the magnetic field is preferably achieved by dividing an outer magnetic pole, surrounding the channel, into separate sectors and winding individual electric coils around the sectors. Control of the current through these individual coils is used to make the appropriate adjustments of magnetic field.

21 Claims, 4 Drawing Sheets

HALL EFFECT PLASMA THRUSTER

FIELD OF INVENTION

This invention relates to a Hall effect plasma thruster, also known as a closed electron drift thruster. The invention arose when considering the design of such thrusters for use on satellites or other spacecraft to assist in adjusting their positions when in orbit around the earth, to move them into the desired orbit or for propelling spacecraft during long missions.

BACKGROUND OF INVENTION

A conventional Hall effect thruster comprises an annular accelerating channel extending circumferentially around an axis of the thruster and also extending in an axial direction from a closed end to an open end. An anode is located, usually at the closed end of the channel, and a cathode is positioned outside the channel close to its open end. Means is provided for introducing a propellant, for example xenon gas, into the channel and this is often done through passages formed in the anode itself or close to the anode. A magnetic system applies a magnetic field in the radial direction across the channel and this causes electrons emitted from the cathode to move circumferentially around the channel. Some but not all of the electrons emitted from the cathode pass into the channel and are attracted towards the anode. The radial magnetic field deflects the electrons in a circumferential direction so that they move in a spiral trajectory, accumulating energy as they gradually drift towards the anode. In a region close to the anode the electrons collide with atoms of the propellant, causing ionization. The resulting positively charged ions are accelerated by the electric field towards the open end of the channel, from which they are expelled at great velocity, thereby producing the desired thrust. Because the ions have a much greater mass than the electrons, they are not so readily influenced by the magnetic field and their direction of acceleration is therefore primarily axial rather than circumferential with respect to the channel. Ions that are neutralized by those electrons from the cathode do not pass into the channel.

In this specification the terms "upstream" and "downstream" will be used for convenience to describe directions with reference to the movement of ions in the channel.

The Hall effect thruster has been widely developed and used, and has been the subject of a great number of publications. The operating principles and characteristics of such devices have been well known since the 1970's. In recent years, no fundamental changes to the operating principles of these devices have been made although there have been various proposals for improvement of particular details of design. One difficulty in the design of these thrusters arises from the erosion of insulator material at the outlet port of the thruster. If inaccuracies of manufacture lead to any misalignment between the geometric axis of the thruster and the thrust axis, this will cause non-symmetrical erosion of the insulator and lead to a decrease in efficiency and lifetime. One possible way of dealing with this problem is to set the electrical circuitry after manufacture so as to adjust the electrical currents passing through respective magnetic coils, thereby correcting any misalignment that would otherwise exist between the thrust axis and the geometric axis.

When in use, known thrusters of this type have always developed a thrust in a fixed direction. Hitherto this has been accepted without question; steering of the spacecraft being achieved either by the use of two thrusters and changing their relative amplitude of thrust; or by the use of a mechanism which swivels a single thruster relative to the spacecraft. The use of two thrusters is expensive and increases weight and the swivelling mechanism is heavy, complex and expensive. It is believed that the present invention will make it possible to eliminate the need either for duplication of thrusters or for the use of a complex swivel mechanism.

The invention is suitably designed to cope with a misaligned axis of thrust, such "misalignment" can be created deliberately in a dynamically changeable basis so as to steer the satellite or other space vehicle in response to a signal indicating a desired change in the direction of thrust.

SUMMARY OF INVENTION

According to the invention there is provided a Hall effect thruster comprising a channel extending around an axis of the thruster and extending in an axial direction from a closed end to an open end, means for introducing a propellent into the channel and means for applying an axial electric field and a radial magnetic field so as to cause ionization of the propellant and acceleration of the resulting ions from the open end of the channel, characterized by steering means for varying the magnetic field in response to a steering signal thereby changing the direction in which the ions are accelerated and therefore the direction of thrust.

It is believed that by employing this technique it will be possible to steer the direction of the thrust through up to 5 degrees from the geometric axis independently in two orthogonal directions. This 5 degree deflection is believed to be sufficient for most purposes. Erosion of the insulator defining the channel along which ions are accelerated can be reduced to an acceptable level by designing this insulator so as to be flared outwardly at its open, downstream, end. In arrangements where the downstream end of the channel is flared, it is preferred that the flare be created by an outward slope of the outer wall of the channel. A similar inward slope of the inner wall would be possible. Alternatively, the design may be such that the inner wall extends downstream less far than the outer wall for the purposes of erosion limitation.

The propellant, which is typically xenon gas, is preferably introduced through or in the region of an anode and this anode preferably extends substantially all of the way around and is applied, as is conventional, between the anode at the closed end of the channel and one or more cathodes located outside the channel close to its open end. The cathode may either be located at a position which is radially outwardly of the channel or radially inwardly of the channel.

The magnetic field is preferably generated by a central source of electromotive force (e.g. a coil or a permanent magnet) around which a number of additional sources of electromotive force (which may also be coils or electromagnets) are positioned. Where magnetic coils are used, the required variation of the magnetic field can be achieved by independently varying the current through different coils.

The channel will normally be defined by a ceramic component because of the high temperatures which are generated. It preferably has a circular cross-section in a plane perpendicular to the axis of the thruster, although other, non-circular configurations are possible. For example, where there are a number of coils or permanent magnets arranged around the outside of the channel, there can be an advantage in making the channel wider in regions adjacent those coils or permanent magnets.

In a preferred form of the invention the means for creating the magnetic field comprises inner and outer magnetic bodies defining opposite magnetic poles and located respectively to the inside and outside of the channel. These magnetic bodies may be permanent magnets or electromagnets. Where the outer magnetic body is an electromagnet, it preferably has an associated electrical coil extending circumferentially around the axis of the thruster. This coil is preferably located radially to the inside of the magnetic body between the magnetic body and an associated screening component which serves to reduce the magnetic field in the area of the anode. The outer magnetic body may be formed with gaps located circumferentially around it so that the magnetic pole which it defines is the magnetic body between the gaps. Each of these sub-poles has an associated electrical coil extending around it and passing through the gaps. The steering means varies the respective electric currents through the different coils so as to deflect the direction of thrust during operation of the thruster.

BRIEF DESCRIPTION OF DRAWINGS

One way of performing the invention will now be described with reference to the accompanying drawings in which.

BEST MODE FOR CARRYING OUT INVENTION

Figure 1:
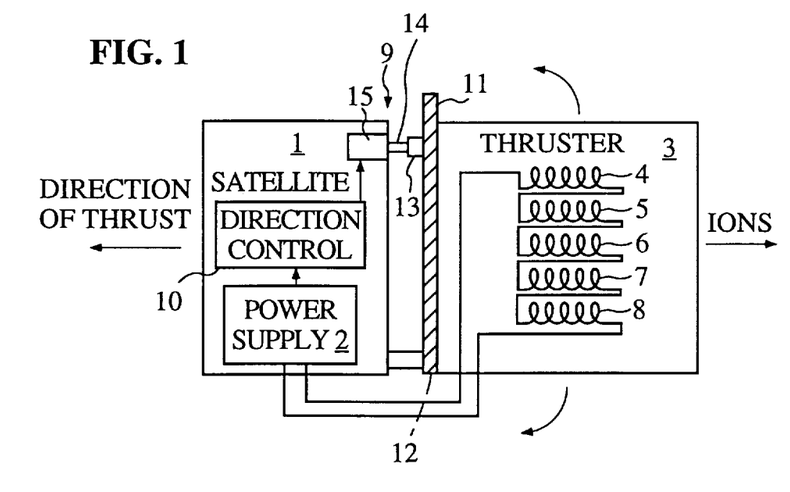
FIG. 1 illustrates, in schematic form, a known technique for steering satellites.

Referring firstly to FIG. 1, this shows, in very schematic form, a known arrangement in which a satellite 1, containing a power supply 2, is propelled by means of a plasma thruster 3. The thruster 3 contains an inner magnetic coil 4 and four outer magnetic coils 5, 6, 7 and 8 connected in series with the power supply 2 so as to receive equal constant currents. The thruster 3 can be adjusted mechanically by a swivel mechanism 9 under the control of a direction control circuit 10. The swivel mechanism comprises a platform 11 hinged at 12 to the satellite and at 13 to a driven shaft 14 of an actuator 15.

Figure 2:
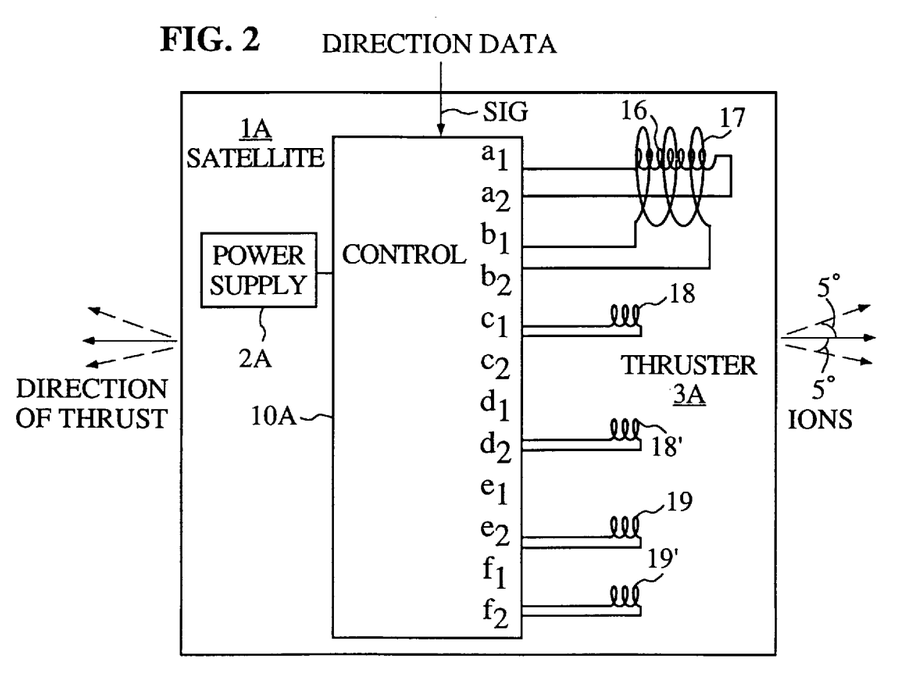
FIG. 2 is an illustration similar to FIG. 1, but showing schematically a satellite arranged to be steered using a technique in accordance with the invention.

An arrangement constructed in accordance with the invention is shown in FIG. 2, also very schematically, and comprises a satellite 1A having a thruster 3A connected rigidly to it; i.e. without the interposition of a swivel mechanism. The thruster 3A has an inner coil 16, an outer coil 17 and four ancillary steering coils 18, 18', 19, 19'. A satellite power supply 2A is connected to a control circuit 10A which receives a direction signal SIG (e.g. from an earth station via a radio link) defining a desired direction of thrust. The circuit 10A has twelve output lines arranged in pairs a1, a2; b1, b2; c1, c2; d1, d2; e1, e2; and f1, f2 and can apply a selected voltage of either polarity at each pair of outputs. The voltage a applied across a1 and a2 is constant, as is the voltage b applied across b1 and b2. The voltage c across c1 and c2 is of approximately the same value as the voltage d across d1 and d2 though there may be a small offset between these values to correct for any misalignment that might otherwise exist between the axis of the thrust vector and the physical axis of the thruster; or to deliberately create such misalignment. The voltages c and d may be of the same or opposite signs depending on the connections to the corresponding coils 18, 18' and are selected by the circuit 10A so as to ensure that current flows in opposite directions through coils 18, 18', thereby controlling the direction of thrust in one plane. Voltages e and f are varied in the same way as (but independently of) voltages c and d so as to control the currents through coils 19, 19' and thus the direction of thrust in an orthogonal plane. In this way the direction of thrust can be adjusted through a total angle of up to 10 degrees in each plane as indicated in broken lines.

Figure 3:
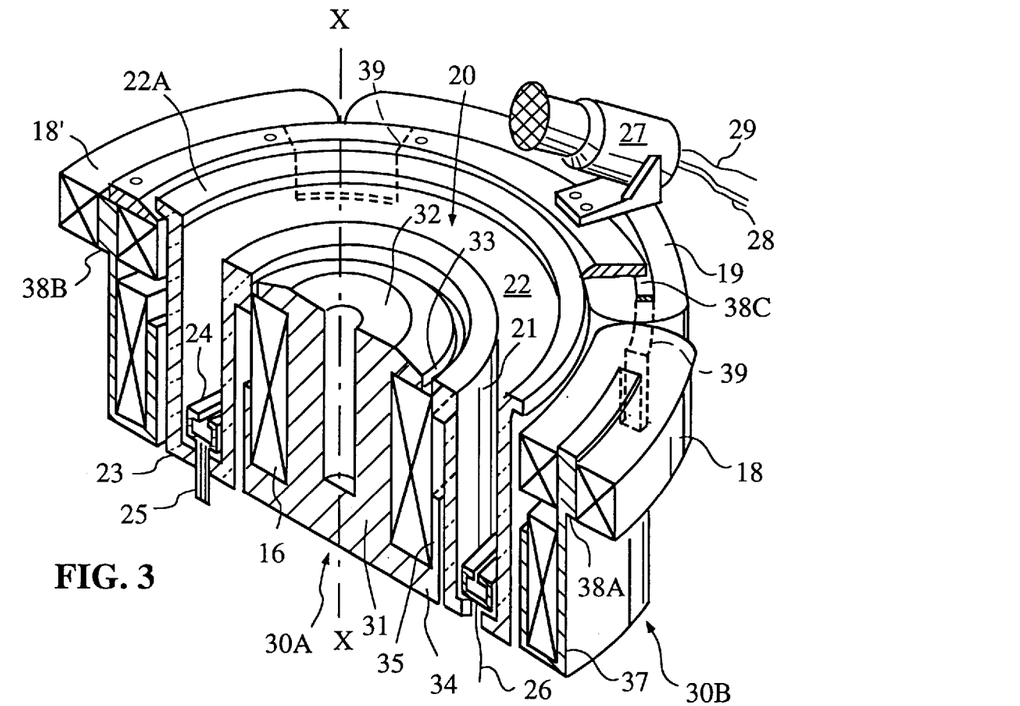
FIG. 3 is a perspective view of a stationary Hall effect plasma thruster constructed in accordance with the invention and illustrated as if cut through its diameter to reveal features of internal construction.
Figure 4:
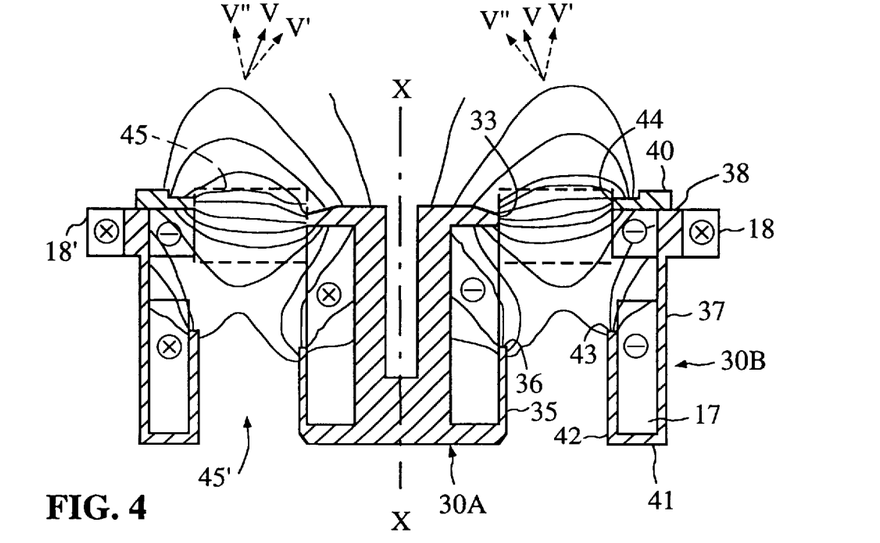
FIG. 4 is a cross-section through the axis X—X of FIG. 3 showing the magnetic components only and lines of magnetic force.

Referring now to FIGS. 3 and 4, the thruster is generally symmetrical about an axis X—X. It comprises an annular accelerating channel 20 defined between inner and outer walls 21, 22 respectively of a closed, upstream end (the bottom as shown on FIG. 3) to an open, downstream end where the outer wall 22 extends in the downstream direction slightly further than the inner wall 21. Both inner and outer walls 21 and 22 are of increased thickness at their respective downstream ends and the outer wall 22 is chamfered at 22A so as to provide a slightly flared open end of the channel.

At the upstream end of the channel there is located a circular anode 24 in the form of a hollow square section tube having a groove extending continuously around it. A pipe 25 delivers a propellant (which is xenon gas in this particular example but could alternatively be krypton or argon) into this hollow anode from which it is delivered to the channel 20 through the circular groove. Baffles (not shown) may be supplied inside the anode in order to improve distribution of the propellant gas around the channel. An electrical connection 26 supplies positive potential to the anode.

A cathode 27 is mounted on a magnetic north pole, to be described later, close to the downstream end of the channel 20. This cathode is supplied with xenon gas through a connection 28 and with a source of negative potential via electrical connector 29. The magnetic system includes two magnetically separate bodies or yokes, namely an inner yoke 30A and an outer yoke 30B, both made of magnetically permeable material.

The inner yoke 30A is in the shape of a spool and has a central cylindrical core part 31 having a central bore for the purposes of weight reduction. An inner coil 16 is wound around this cylindrical part so that current passes in a clockwise direction as viewed from the downstream end. At the downstream end of the cylindrical part 31 is a radially outwardly extending end-piece in the form of a flange 32 which defines at its free edge a first, circular pole 33 (magnetic south) of the inner magnetic yoke. Another end-piece in the form of a radially outwardly extending flange 34 supports a cylindrical wall 16 which partly encloses the inner coil 32 and defines a second (magnetic north) pole at its free edge 36, as seen best on FIG. 4.

The outer yoke 30B is formed by a cylindrical wall 37 coaxial with the axis X—X and having a circular rim 38 of increased thickness. This rim is divided by four slots or gaps 39 (FIG. 3) serving to divide the rim 38 into four equal sectors 38A, 38B, 38C and 38D. Each of these sectors has a subsidiary, steering, coil wound around it. These steering coils are the same coils as are shown at 18, 18', 19, 19' on FIG. 2 and they are arranged so that current passes clockwise around one and anticlockwise around the opposite coil. A first, radially inwardly extending end-piece, in the form of a flange 40, is attached to the four sectors of the rim 38. This flange 40 is circular and bridges the gaps between the rim sectors 38. It is shown partly broken away on FIG. 3 so as to reveal the underlying parts. The circular, radially inner, edge of the flange 40 forms a first (magnetic north) pole of the body 30B and is positioned, as is best seen on FIG. 4, slightly downstream of the magnetic south pole 33 of the body 30A. The upstream end of the cylindrical wall 37 extends into another inwardly extending circular flange 41 which in turn extends into a cylindrical wall 42 coaxial with the axis X—X. The walls 37, 41 and 42 define an enclosure which contains a main outer coil 17 (also shown on FIG. 2) which is wound around the wall 42 and is connected so that current flows in the direction shown in FIG. 4 such as to create a magnetic south pole at the downstream edge 43 of the wall 42 and a magnetic north pole at the inner edge 44 of the flange 40.

FIG. 4 shows the lines of magnetic field when current is passing through the inner coil 16 and the outer coil 17 but not through the steering coils 18, 18', 19 and 19'. It will be seen from FIG. 4 that the offset between the poles 33 and 44 results in the magnetic field being tilted in an annular accelerating zone 45 where, in operation, the ions are accelerated. This tilt of the magnetic field causes the ions to be accelerated in a direction shown by the arrows V towards the axis X—X. The purpose of this is to limit the divergence of the resulting plume of ions from the thruster. A point worth noting is that the cylindrical walls 35 and 42 serve to screen the area 45' where the anode is located from the effects of the magnetic field.

Operation of the illustrated thruster is as follows. Electrons are emitted from the cathode 27 and are divided into two streams. One stream of such electrons is attracted towards the anode 24 into the annular channel 20. The radial component of the magnetic field within the channel causes the electrons to travel in a circumferential direction, gradually drifting in an axial direction towards the anode. In the region 45' of the anode, where there is only minimal magnetic field, the electrons, having acquired energy during their spiral movement down the channel, cause ionization of the propellant gas supplied along the pipe 25.

The resulting ions, which are positively charged, are accelerated in a downstream direction by an electric field produced by a potential difference of about 300 volts, between anode and cathode. Because of their relatively high mass, as compared with the mass of electrons, the propellant ions are not greatly influenced by the magnetic field. There is however some such influence and the inclined nature of the magnetic field in the accelerating region 45 between poles 33 and 44 causes the stream of ions, issuing from the downstream end of the thruster, to tend to converge in the direction indicated by the letter V. When a current is passing through the coils 18, 18', the effect of the magnetic field on the ions issuing from one side of the thruster is increased because the magnetic field strength there is increased, whilst the effect is decreased on the opposite side of the thruster. Thus a deflection in the direction of the vector is achieved as shown at V' and V" on FIG. 4. By controlling the currents through coils 18, 18' on the one hand and 19, 19' on the other hand, the direction of thrust can be displaced in any direction.

It was mentioned earlier that the electrons emitted from the cathode 27 were divided into two streams and that one of these streams entered the accelerating channel. The other stream of electrons is effective to neutralize the ions as they are ejected from the thruster so as to avoid leaving a resultant negative charge on the thruster. Erosion of the downstream edge of the outer ceramic wall 22, caused by steering of the thrust vector, is reduced by the presence of the chamfer 22a, whilst reduction in erosion of the corresponding edge of the inner wall 21 is reduced by its displacement in the upstream direction relative to the corresponding chamfered edge of the outer wall 22.

An important feature of the illustrated embodiment of the invention is that the magnetic bodies 30A and 30B are magnetically separate, each constituting an individual electromagnet having its own north and south poles. Because of this, it is possible to obtain the required magnetic characteristics within the accelerating channel with a wide variety of different overall dimensions of the magnetic system, different from those dimensions shown in FIGS. 3 and 4. For example, it is predicted that it will now be possible to manufacture Hall effect thrusters which, for a given power, are shorter in the axial direction and wider in diameter (or vice versa). A thruster can therefore now be designed which makes better use of available space on a satellite or in the launching vehicle.

Body 30A defining the inner magnetic south pole is divided by radial slots into four segments S1, S2, S3 and S4; and the circular flange 40 defining the outer magnetic north pole is similarly divided into four segments N1, N2, N3 and N4. The slots or gaps between the thus formed individual north poles is notably smaller than the much larger slots or gaps 39 which accommodate the steering coils 18, 18', 19, 19'. The individual north poles thus overlap end portions of the coils where they pass through the gaps. This design variation shown in FIG. 5 provides improved steering capability.

Figure 5:
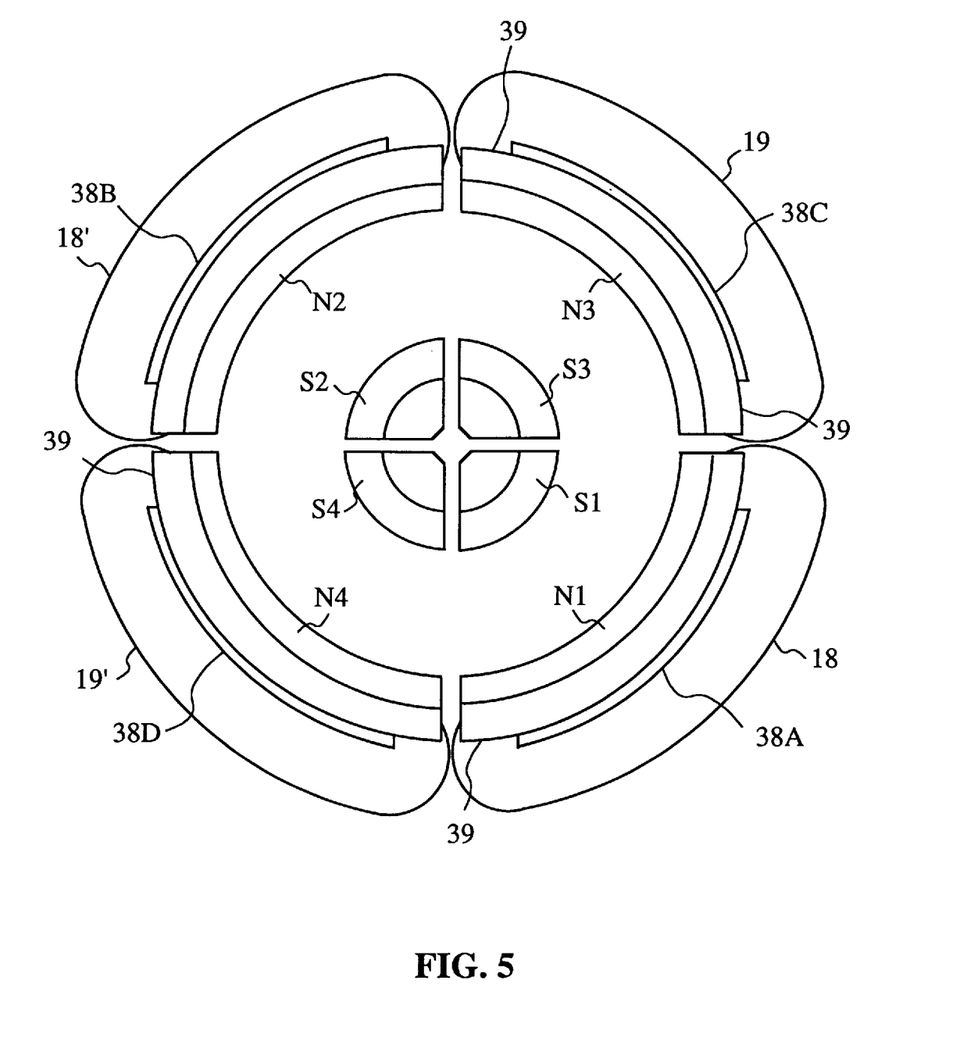
FIG. 5 is a plan view of the components shown in FIG. 4 but showing a design variation in which the magnetic poles are divided into four separate parts.
Figure 6:
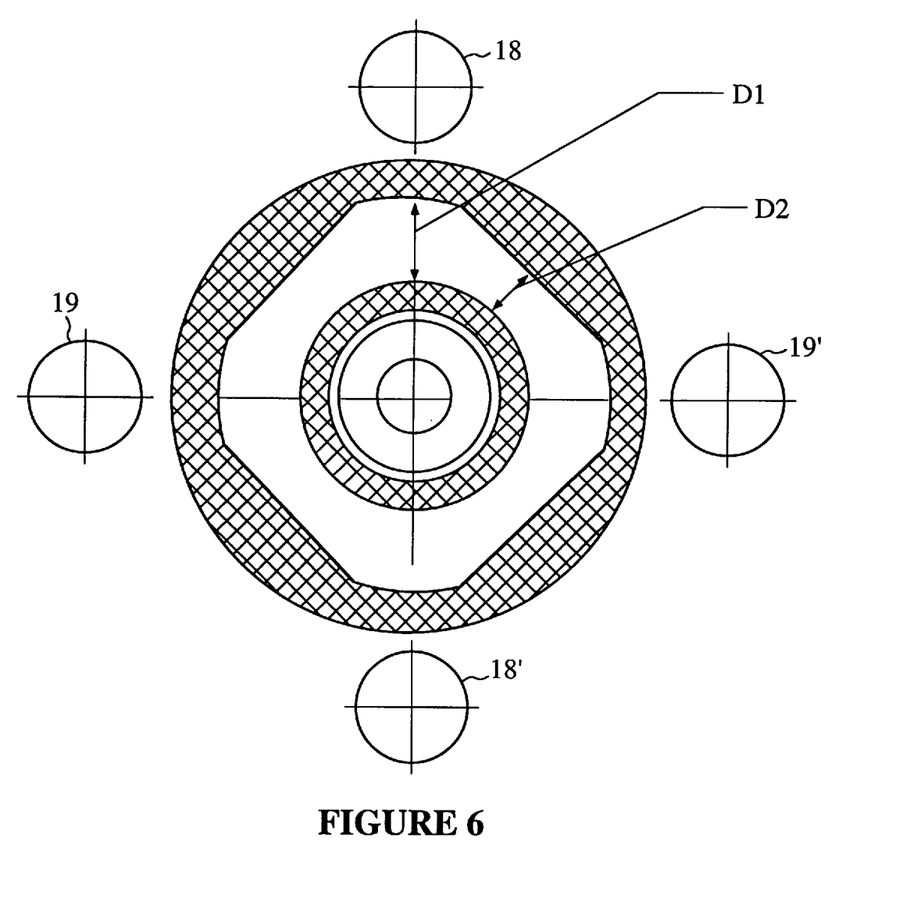
FIG. 6 is a schematic view of an alternate embodiment of the invention in which the gap between the walls of the thruster is larger near the magnetic poles than elsewhere.

FIG. 6 depicts schematically an alternative design to that of FIG. 5 with the alteration being in the shape of the channel 20. The distance between the walls of the channel 20 is greater at D1 adjacent the ancillary steering coils 18, 18', 19, 19', and is lesser at D2 at positions removed from the ancillary steering coils 18, 18', 19, 19'. It will be noted that erosion is reduced in this design during steering. A combination of chamfering, as seen at 22A in FIG. 3, and varying the gap between the walls of the channel 20, as shown in FIG. 6, can be utilized.

It will be appreciated that the particular embodiment of the invention shown in the drawings has been described only by way of example and that the invention is in no way limited to particular features of this example. For example, the invention is also applicable to the so-called anode layer thruster. Where a construction similar to that illustrated is used, various variations of design would be possible. For example, the steering effect could be improved by dividing the flange 40 into four separate sectors corresponding with the sectors 38a, 38b, 38c and 38d, thereby forming four separate main magnetic north poles. Another variation would be for the coil 17 to be located on the outside, rather than the inside, of the cylindrical magnetic wall 37. Another possible variation would be to omit the coil 17 and, Also, either or both of the coils 16 and 17 could of course be replaced by permanent magnets. Alternatively the magnetic bodies 30A and 30B could be formed as permanent magnets. Yet another possible variation would be to have just three steering coils, or any number greater than four.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

That which is claimed is:

1. A Hall effect thruster comprising:

a channel means of non magnetic material having a channel therein, the channel extending around a center axis (X—X) of the thruster and formed between an inner side wall which is closest to the center axis (X—X) within the channel means and an outer side wall within the channel means, the inner side wall and the outer side wall extending in an axial direction from a closed end to an open end of the channel formed in the channel means and wherein the channel is shaped to reduce erosion of one or more surfaces of the channel and wherein the inner side wall extends axially a first distance towards the open end of the channel and the outer wall extends a second distance to the open end of the channel where the first distance is less than the second distance to reduce erosion of the channel surface of the inner wall;

means for introducing a propellent into the channel near the closed end of the channel;

electric field means applying an axial electric field within the channel for generating ions of the propellant and for axial accelerating the ions within the channel towards and out of the open end of the channel;

magnetic field means for selectively applying a radial magnetic field across the channel to vary the direction of thrust of the thruster between 1.6 degrees to 5 degrees from the center axis of the thruster.

2. The thruster according to claim 1 wherein said magnetic field means controls the strength of the magnetic field independently along two axes located in a plane perpendicular to the center axis (X—X) of the thruster.

3. The thruster according to claim 1 or 2 wherein said magnet field means further comprises two pairs of electro magnets, the electro magnets of each pair of electro magnets located on opposite sides of the thruster, where the electric current passing through the electro magnets controls the direction thrust.

4. The thruster according to claim 3 wherein the two pairs of electro magnets are arranged to control the direction of thrust in respective orthogonal directions.

5. A thruster according to claim 1, wherein the shape of the outer side wall of the channel is non uniform to reduce erosion of channel surface of the outer side wall.

6. A thruster according to claim 1, wherein the shape of the outer side wall of the channel is tapered away from the center axis of the thruster in an area of the open end of the channel to reduce erosion of the channel surface of the outer side wall.

7. A thruster according to claim 1, wherein the shape of the inner side wall of the channel is tapered towards the center axis of the thruster to reduce erosion of the channel surface of the inner side wall.

8. A Hall effect thruster comprising:

a channel means of non magnetic material having a channel therein, the channel extending around a center axis (X—X) of the thruster and formed between an inner side wall which is closest to the center axis (X—X) within the channel means and an outer side wall within the channel means, the inner side wall and the outer side wall extending in an axial direction from a closed end to an open end of the channel formed in the channel means;

means for introducing a propellent into the channel near the closed end of the channel;

electric field means applying an axial electric field within the channel for generating ions of the propellant and for axial accelerating the ions within the channel towards and out of the open end of the channel;

magnetic field means comprising:

an inner magnetic portion located between the channel means and center axis (X—X) and extending around the channel means for generating an inner magnetic field extending into the channel;

an outer magnetic portion located outboard of the channel means and extending around the channel means for generating an outer magnet field extending into the channel, the outer magnetic portion having an inner pole piece and an outer wall connected to an outer pole piece where the outer wall is formed with gaps dividing the outer wall into a plurality of outer sub-walls around an arcuate portion of the inner pole piece and the outer pole piece of the outer magnetic portion is divided into a plurality of outer pole pieces where each outer pole piece is in contact with an outer sub-wall of the plurality of outer sub-walls, each outer sub-wall of the plurality of outer sub-wall having an associated electrical coil for to form a steering electro-magnet of a plurality of steering electro-magnets, the plurality of steering electro-magnets coacting to control the strength of the outer magnetic field between the outer pole piece and the inner pole piece at various locations within the channel; and the outer magnetic field coacting with the inner magnetic field to form within the channel a resulting a non uniformed radial magnet field across the channel for controlling the direction of acceleration of the ions and the direction of trust of the thruster.

9. The thruster of claim 8, wherein the magnetic field means selectively applying a radial magnetic field across the channel to vary the direction of thrust of the thruster between 0 degrees to 5 degrees from the center axis of the thruster.

10. A thruster according to claim 8 wherein said inner pole piece of the outer magnetic portion is divided into a plurality of inner sub pole pieces where each inner pole piece is associated with an outer pole piece of the outer magnetic portion.

11. A thruster according to claim 8 wherein said inner pole piece of said outer magnetic portion is a continuous circular inner pole piece.

12. A thruster according to claim 8 wherein said outer magnetic portion further includes a main coil for creating a main electro-magnet which coacts with the plurality of steering electro-magnets for creating the magnetic field between the inner magnetic pole piece of the outer magnetic portion.

13. A thruster according to claim 8 wherein the gaps are slots in the outer pole piece extending in an axial direction partially along the axial length of the outer pole piece of the outer magnetic portion.

14. The thruster according to claim 8 wherein the channel is shaped to reduce erosion of one or more surfaces of the channel.

15. A thruster according to claim 14, wherein the inner side wall extends axially a first distance towards the open end of the channel and the outer wall extends a second distance to the open end of the channel where the first distance is less than the second distance to reduce erosion of the channel surface of the inner wall.

16. A Hall effect thruster comprising:
   a channel means of non magnetic material having a channel therein, the channel extending around a center axis (X—X) of the thruster and formed between an inner side wall which is closest to the center axis (X—X) within the channel means and an outer side wall within the channel means where the outer wall is shaped to reduce erosion of channel surface of the outer side wall, the inner side wall and the outer side wall extending in an axial direction from a closed end to an open end of the channel formed in the channel means and the inner side wall extends axially a first distance towards the open end of the channel and the outer wall extends a second distance to the open end of the channel where the first distance is less than the second distance to reduce erosion of the channel surface of the inner wall;
   means for introducing a propellent into the channel near the closed end of the channel;
   electric field means applying an axial electric field within the channel for generating ions of the propellant and for axial accelerating the ions within the channel towards and out of the open end of the channel;
   magnetic field means for selectively applying a radial magnetic field across the channel.

17. A Hall effect thruster comprising:
   a channel means of non magnetic material having a channel therein, the channel extending around a center axis (X—X) of the thruster and formed between an inner side wall which is closest to the center axis (X—X) within the channel means and an outer side wall within the channel means, the inner side wall and the outer side wall extending in an axial direction from a closed end to an open end of the channel formed in the channel means and the channel is shaped to reduce erosion of one or more surfaces of the channel wherein the inner side wall extends axially a first distance towards the open end of the channel and the outer wall extends a second distance to the open end of the channel where the first distance is less than the second distance to reduce erosion of the channel surface of the inner wall;
   means for introducing a propellent into the channel near the closed end of the channel;
   electric field means applying an axial electric field within the channel for generating ions of the propellant and for axial accelerating the ions within the channel towards and out of the open end of the channel;
   magnetic field means comprising:
      an inner magnetic portion located between the channel means and center axis (X—X) and extending around the channel means for generating an inner magnetic field extending into the channel;
      an outer magnetic portion located outboard of the channel means and extending around the channel means for generating an outer magnet field extending into the channel, the outer magnetic portion having an inner pole piece and an outer wall connected to an outer pole piece where the outer wall is formed with gaps dividing the outer wall into a plurality of outer sub-walls around an arcuate portion of the inner pole piece, each outer sub-wall of the plurality of outer sub-wall having an associated electrical coil for to form a steering electro-magnet of a plurality of steering electro-magnets, the plurality of steering electro-magnets coacting to control the strength of the outer magnetic field between the outer pole piece and the inner pole piece at various locations within the channel; and
      the outer magnetic field coacting with the inner magnetic field to form within the channel a resulting a non uniformed radial magnet field across the channel for controlling the direction of acceleration of the ions and the direction of trust of the thruster.

18. A thruster according to claim 17 wherein the outer pole piece of the outer magnetic portion is divided into a plurality of outer pole pieces where each outer pole piece is in contact with an outer sub-wall of the plurality of outer sub-walls.

19. A Hall effect thruster comprising:
   a channel means of non magnetic material having a channel therein, the channel extending around a center axis (X—X) of the thruster and formed between an inner side wall which is closest to the center axis (X—X) within the channel means and an outer side wall within the channel means, the inner side wall and the outer side wall extending in an axial direction from a closed end to an open end of the channel formed in the channel means and wherein the channel is shaped to reduce erosion of one or more surfaces of the channel and wherein the shape of the inner side wall of the channel is tapered towards the center axis of the thruster to reduce erosion of the channel surface of the inner side wall;
   means for introducing a propellent into the channel near the closed end of the channel;
   electric field means applying an axial electric field within the channel for generating ions of the propellant and for axial accelerating the ions within the channel towards and out of the open end of the channel;
   magnetic field means for selectively applying a radial magnetic field across the channel to vary the direction of thrust of the thruster between 1.6 degrees to 5 degrees from the center axis of the thruster.

20. A Hall effect thruster comprising:
   a channel means of non magnetic material having a channel therein, the channel extending around a center axis (X—X) of the thruster and formed between an inner side wall which is closest to the center axis (X—X) within the channel means and an outer side wall within the channel means where the outer wall is shaped to reduce erosion of channel surface of the outer side wall, the inner side wall and the outer side wall extending in an axial direction from a closed end to an open end of the channel formed in the channel means and the shape of the inner side wall of the channel is tapered towards the center axis of the thruster to reduce erosion of the channel surface of the inner side wall;
   means for introducing a propellent into the channel near the closed end of the channel;
   electric field means applying an axial electric field within the channel for generating ions of the propellant and for axial accelerating the ions within the channel towards and out of the open end of the channel;
   magnetic field means for selectively applying a radial magnetic field across the channel.

21. A Hall effect thruster comprising:
   a channel means of non magnetic material having a channel therein, the channel extending around a center axis (X—X) of the thruster and formed between an inner side wall which is closest to the center axis (X—X) within the channel means and an outer side wall within the channel means, the inner side wall and the outer side wall extending in an axial direction from a closed end to an open end of the channel formed in the channel means and the channel is shaped to reduce erosion of one or more surfaces of the channel wherein the shape of the inner side wall of the channel is tapered towards the center axis of the thruster to reduce erosion of the channel surface of the inner side wall;

means for introducing a propellent into the channel near the closed end of the channel;

electric field means applying an axial electric field within the channel for generating ions of the propellant and for axial accelerating the ions within the channel towards and out of the open end of the channel;

magnetic field means comprising:

an inner magnetic portion located between the channel means and center axis (X—X) and extending around the channel means for generating an inner magnetic field extending into the channel;

an outer magnetic portion located outboard of the channel means and extending around the channel means for generating an outer magnet field extending into the channel, the outer magnetic portion having an inner pole piece and an outer wall connected to an outer pole piece where the outer wall is formed with gaps dividing the outer wall into a plurality of outer sub-walls around an arcuate portion of the inner pole piece, each outer sub-wall of the plurality of outer sub-wall having an associated electrical coil for to form a steering electro-magnet of a plurality of steering electro-magnets, the plurality of steering electro-magnets coacting to control the strength of the outer magnetic field between the outer pole piece and the inner pole piece at various locations within the channel; and the outer magnetic field coacting with the inner magnetic field to form within the channel a resulting a non uniformed radial magnet field across the channel for controlling the direction of acceleration of the ions and the direction of trust of the thruster.

* * * * *

UNITED STATES PATENT AND TRADEMARK OFFICE
CERTIFICATE OF CORRECTION

PATENT NO. : 5,845,880
DATED : December 8, 1998
INVENTOR(S) : V.A. Petrosov et al.

It is certified that error appears in the above-indentified patent and that said Letters Patent is hereby corrected as shown below:

Column 4, line 58, "16" should be --35--.
Column 4, line 16, "32" should be --6--.
Column 6, line 38, "wails" should be --walls--.
Column 6, line 59, "coil 17 and." should be --coil 17.--.
Column 7, line 38, "claim 1" should be --claim 1 or 19--.
Column 7, line 42, "or 2" should be --or 19--.
Column 7, line 51, "claim 1," should be --claim 1, 14, 16, 17, 19, 20 or 21--.
Column 7, line 54, "claim 1," should be --claim 1, 14, 16, 17, 19, 20 or 21--.
Column 7, line 59, "claim 1," should be --claim 1, 14, 16 or 17--.
Column 8, line 28, "plurality of outer sub-wall" should be --plurality of outer sub-walls--.
Column 8, line 37, after "resulting" delete "a".
Column 8, line 40, "trust" should be --thrust--.
Column 8, line 41, "claim 8," should be --claim 8, 17 or 21--.
Column 8, line 45, "claim 8" should be --claim 8 or 18--.
Column 8, line 50, "claim 8" should be --claim 8 or 18--.
Column 8, line 53, "claim 8" should be --claim 8, 17 or 21--.
Column 8, line 59, "claim 8" should be --claim 8, 17 or 21--.
Column 10, line 1, "sub-wall" should be --sub-walls--.
Column 10, line 9, after "resulting" delete "a".
Column 10, line 12, "trust" should be --thrust--.
Column 10, line 13, "claim 17" should be --claim 17 or 21--.
Column 12, line 10, "sub-wall" should be --sub-walls--.

UNITED STATES PATENT AND TRADEMARK OFFICE
CERTIFICATE OF CORRECTION

PATENT NO. : 5,845,880
DATED : December 8, 1998
INVENTOR(S) : V.A. Petrosov et al.

It is certified that error appears in the above-indentified patent and that said Letters Patent is hereby corrected as shown below:

Column 12, line 18, after "resulting" delete "a".
Column 12, line 21, "trust" should be --thrust--.

Signed and Sealed this

Twenty-second Day of February, 2000

Attest:

Q. TODD DICKINSON

Attesting Officer

Commissioner of Patents and Trademarks